UNITED STATES PATENT OFFICE 2,057,076

PREPARATION OF TETRANITROMETHANE

Joseph A. Wyler, Allentown, Pa., assignor to Trojan Powder Company, a corporation of New York No Drawing. Application January 29, 1936, Serial No. 61,315

6 Claims. (Cl. 260—144)

My invention relates to improvements in the preparation or manufacture of tetranitromethane, and more particularly relates to an improved process for the manufacture of tetranitromethane at a low temperature and with relatively high yields. One of the objects of my invention is to increase the safety of the manufacture of tetranitromethane by performing the reactions leading to the formation of this body at a low temperature, and another object of my invention is to increase the yield of tetranitromethane obtained in the chemical process of its manufacture by reducing those reactions which otherwise lead to the formation of undesirable by-products.

I have discovered that through the use of certain catalytic agents the preparation of tetranitromethane by the action of nitric acid on acetic anhydride may be conducted at a lower temperature than can be used in the absence of such catalysts, and that in the presence of such catalysts the action of nitric acid on acetic anhydride proceeds in a very smooth and regular manner, and with yields up to 80% of theory.

The main reaction which probably occurs when nitric acid acts on acetic acid is represented by the following equation:

$$4(CH_3CO)_2O + 4HNO_3 = C(NO_2)_4 + CO_2 + 7CH_3COOH$$

It is recognized that although the above equation probably represents the main reaction there are also a number of other reactions which occur at the same time that the main reaction occurs, and which result in the formation of a number of undesirable by-products. Even by the use of my preferred catalysts I am not able to entirely avoid these undesirable side-reactions that lead to the formation of useless by-products and which reduce the yield of tetranitromethane formed, but by the use of my process I am able to obtain tetranitromethane of a higher purity than is possible by the use of other processes now known, and I am also able to obtain a higher yield of tetranitromethane from any given amount of my initial raw materials.

I have discovered that when acetic anhydride and nitric acid react in the presence of small amount of phosphoric acid, phosphorus pentoxide, phosphorus oxychloride, phosphorus trichloride, phosphorus pentachloride, sulfuric acid, sulfuryl chloride, boron triacetate, acetyl chloride, hydrochloric acid, or mixtures of these, and particularly when acetic anhydride and nitric acid react in the presence of any of the above catalysts or of mixtures of any of the above catalysts in the presence of sharp angular pieces of quartz, glass or like material insoluble in water and in the reacting mixture, the reaction proceeds not only at a lower temperature than in the absence of such assisting materials, but also proceeds much more uniformly and smoothly, and with the avoidance of the formation of large quantities of by-products, and accordingly with the production of a higher yield of tetranitromethane.

I have further discovered that in the presence of glacial acetic acid, as by diluting the acetic anhydride or the nitric acid or the mixture of acetic anhydride and nitric acid with glacial acetic acid, in the presence of any of the above catalysts, the operation becomes even more uniform than in the absence of such glacial acetic acid, and the reaction proceeds at an even lower temperature than in the absence of such glacial acetic acid, although the yield is not quite as good as when the reacting mixture is undiluted by the presence of glacial acetic acid.

My process for the manufacture of tetranitromethane may be carried out either continuously or in individual batches. In the continuous process of manufacture I may add acetic anhydride and nitric acid simultaneously or intermittently to a mixture of nitric acid, acetic anhydride and catalyst that is already in partial reaction, and in which the reaction has proceeded to the extent of about 20% of theory, for example. I may, for example, continuously feed a reaction mixture of acetic anhydride, nitric acid and catalyst to a tower or a series of towers filled with quartz, drawing the final product of reaction either continuously or intermittently from a suitable opening at the bottom of the tower.

In the discontinuous or vat process I may use any suitable tank, preferably provided with a stirrer, and preferably provided with cooling coils.

I find that cooling to keep the temperature lower than 40° C. during the reaction period is desirable, and I find that the optimum temperature is about 15° C. The temperature can be regulated by the rate of addition of the reagents, as well as by the extent of cooling applied to the reaction vessel, and preferably I employ these two methods in conjunction, the reaction mixture being cooled by the circulation of a cooling fluid through suitable pipes or coils, and the rate of addition of the reagents being so controlled that the temperature will not exceed the desired maximum of 40° C., as any temperature higher than this results in a loss of yield.

The proportions of nitric acid and acetic anhydride may be varied slightly from the proportions indicated by theory, and I find that a slight excess of nitric acid over that required by theory is desirable. I prefer to use from 2% to 10% of catalyst, based on the weight of nitric acid used, and I may add the catalyst at any convenient time and in any convenient manner, provided the catalyst is present in the reaction mixture during the major portion of the reaction between the nitric acid and the acetic anhydride.

The following specific embodiments will illustrate the methods and proportions which I prefer to use in the practice of my invention:

*Example 1.*—2.7 parts of sulfuryl chloride are dissolved in 200 parts of commercial acetic anhydride and this mixture is added to 136 parts of 99% nitric acid contained in a tank provided with a stirrer, a reflux condenser and means for cooling. The rate of addition of the mixture of sulfuryl chloride and acetic anhydride to the nitric acid should preferably be slow, so that the temperature will not rise higher than 20° C. at any time during the addition. The bottom of the tank may be provided with a layer of sharp pieces of quartz or other angular solid, although this is not essential. The reaction mixture is stirred slowly until the reaction is complete, this requiring from 48 hours to 5 days according to the temperature at which the reacting mass is maintained, and this temperature should never exceed 40° C. at any time during the progress of the reaction.

The reaction product is run into an excess of water to precipitate the tetranitromethane, which separates as a lower layer. The water layer will contain some tetranitromethane which will not go into the lower layer containing the main body of the tetranitromethane, and this tetranitromethane contained in the water mixture may be recovered by distillation of the aqueous fluid with steam.

The tetranitromethane is washed first with water, then with a 2% solution of sodium bicarbonate, and is then given a final wash with water. The tetranitromethane separates as a clear colorless liquid, and under the conditions described in this example the yield will be about 80% of the theoretical yield.

*Example 2.*—By using a mixture of 200 parts of acetic anhydride and 5.5 parts of phosphorus pentachloride, and adding this mixture to 148 parts of 99% nitric acid, but otherwise proceeding the same as in Example 1, tetranitromethane will be obtained with a yield of about 70% of the theoretical yield.

*Example 3.*—Using a mixture of 6 parts of sulfuric acid in 148 parts of 99% nitric acid, and to this mixture adding 200 parts of acetic anhydride, and maintaining the temperature lower than 20° C. and conducting the reaction in all other respects in accordance with the procedure outlined under Example 1, a good yield of tetranitromethane can be obtained.

*Example 4.*—3 parts of sulfuryl chloride are dissolved in 200 parts of acetic anhydride and this mixture is added to a mixture of 148 parts of 99% nitric acid and 3 parts of sulfuric acid. The temperature is maintained below 20° C. during the mixing of the reagents, and in all other respects the reaction is conducted in accordance with the procedure outlined under Example 1.

*Example 5.*—1 part of phosphorus pentachloride and 1 part of acetyl chloride dissolved in 200 parts of acetic anhydride are admixed with 148 parts of 99% nitric acid while maintaining the temperature below 20° C. In all other respects the same procedure is followed as given under Example 1.

Many other examples could be given, but it is believed that the above will clearly indicate the characteristic features of my invention. When sulfuric acid is used as the catalyst I may use an amount of sulfuric acid equal to 10% of the weight of the nitric acid used, but I do not find that so high a percentage of catalyst is necessary in order to obtain the advantages of my invention, and in general I prefer to use an amount of catalyst to the extent of from 1% to 6% of the weight of nitric acid used. I may use any catalyst from the list which I have given herein, either alone or in admixture with one or more other assisting agents from the list given. I may vary the order of the addition of the reacting materials, and I may use nitric acid of any available strength from a strength of 93% up to chemically pure nitric acid, and I may vary the relative proportions of nitric acid to acetic anhydride although I prefer to use substantially the theoretical proportions of my reacting materials, with a very slight excess of nitric acid.

It will of course be evident that I may vary the mechanical operations involved in the described reaction as to both the nature of the vessels employed and as to the nature of the operations involved, and my invention is not to be limited to any of the mechanical steps that I have described, as my invention relates more particularly to the chemical reactions which is only incidentally modified or controlled by such mechanical steps as stirring, refluxing, cooling, etc.

It will be evident that many changes may be made within the scope of the disclosure of my invention herein given, and accordingly no limitations should be placed upon my invention except as indicated in the appended claims.

I claim:

1. In the process of making tetranitromethane the step which comprises reacting acetic anhydride and nitric acid in the presence of a member of the group consisting of phosphoric acid, phosphoric pentoxide, phosphorus oxychloride, phosphorus trichloride, phosphorus pentachloride, sulfuric acid, sufuryl chloride, boron triacetate, acetyl chloride and hydrochloric acid.

2. In the process of making tetranitromethane the step which comprises reacting acetic anhydride, acetic acid and nitric acid in the presence of a member of the group consisting of phosphoric acid, phosphoric pentoxide, phosphorus oxychloride, phosphorus trichloride, phosphorus pentachloride, sulfuric acid, sulfuryl chloride, boron triacetate, acetyl chloride and hydrochloric acid.

3. In the process of making tetranitromethane the step which comprises reacting acetic anhydride and nitric acid in the presence of angular particles of a substance insoluble in water and insoluble in the reacting mixture, in the presence of an assisting agent selected from the group consisting of phosphoric acid, phosphoric pentoxide, phosphorus oxychloride, phosphorus trichloride, phosphorus pentachloride, sulfuric acid, sulfuryl chloride, boron triacetate, acetyl chloride and hydrochloric acid.

4. In the process of making tertanitromethane the step which comprises reacting acetic anhydride and nitric acid at a temperature lower than 40° C., in the presence of an assisting agent selected from the group consisting of phosphoric acid, phosphoric pentoxide, phosphorus oxychloride, phosphorus trichloride, phosphorus pentachloride, sulfuric acid, sulfuryl chloride, boron triacetate, acetyl chloride and hydrochloric acid.

5. In the process of making tetranitromethane the step which comprises reacting acetic anhydride, acetic acid and nitric acid at a temperature lower than 40° C. in the presence of angular particles of a substance insoluble in water and insoluble in the reacting mixture, in the presence of an assisting agent selected from the group consisting of phosphoric acid, phosphoric pentoxide, phosphorus oxychloride, phosphorus trichloride, phosphorus pentachloride, sulfuric acid, sulfuryl chloride, boron triacetate, acetyl chloride and hydrochloric acid.

6. In the process of making tetranitromethane the step which comprises the reacting of nitric acid and acetic anhydride at a temperature below 40° C. in the presence of additional acetic acid over and above that formed in the reaction itself in the presence of angular particles of a substance insoluble in water and insoluble in the reacting mixture, in the presence of an assisting agent selected from the group consisting of phosphoric acid, phosphoric pentoxide, phosphorus oxychloride, phosphorus trichloride, phosphorus pentachloride, sulfuric acid, sulfuryl chloride, boron triacetate, acetyl chloride and hydrochloric acid.

JOSEPH A. WYLER.